Jan. 29, 1935.  L. R. WESTBROOK  1,989,124
PROCESS OF MAKING AMMONIUM SULPHATE
Filed March 24, 1930
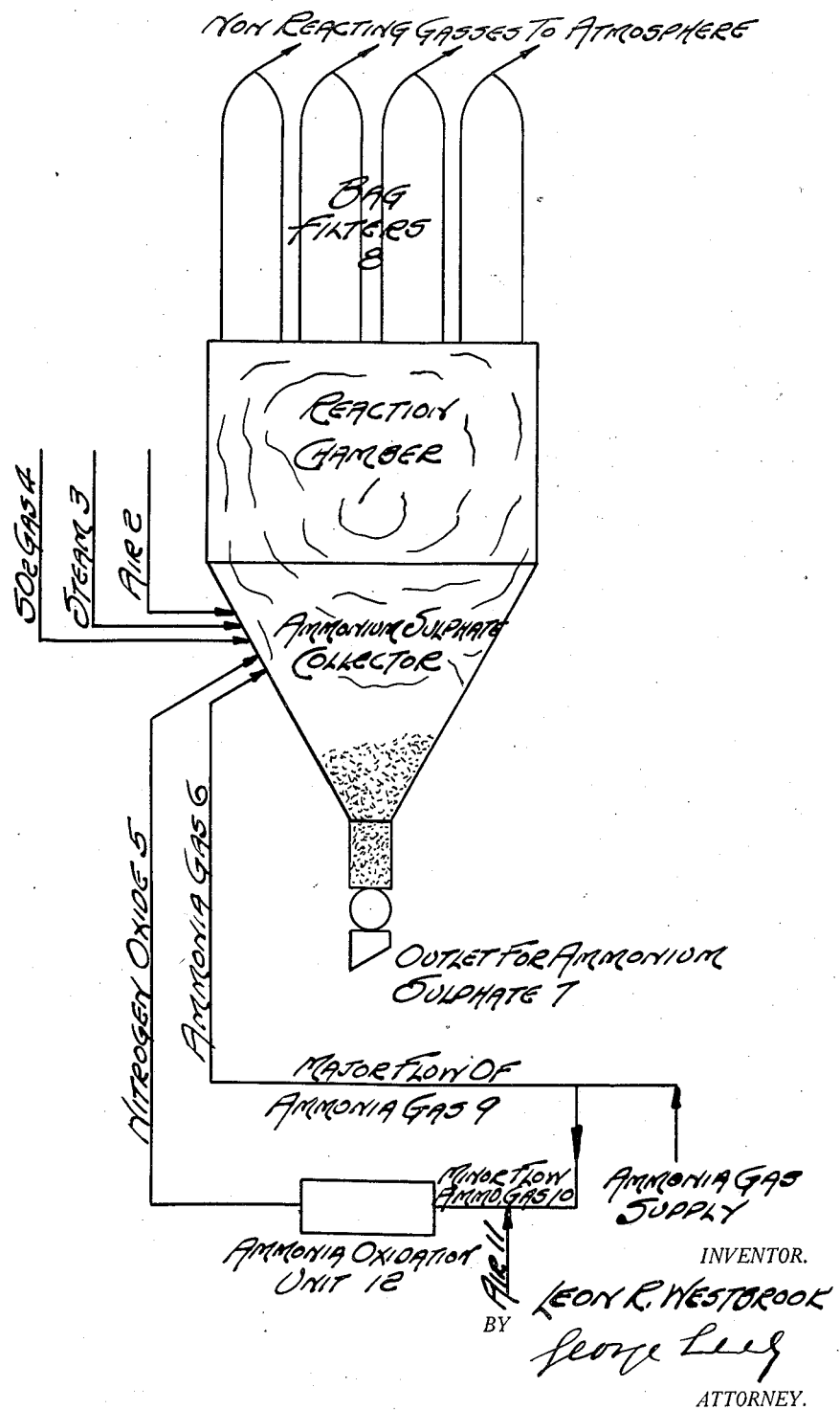
INVENTOR.
LEON R. WESTBROOK
BY
George Lee
ATTORNEY.

Patented Jan. 29, 1935

1,989,124

UNITED STATES PATENT OFFICE 1,989,124

PROCESS OF MAKING AMMONIUM SULPHATE

Leon R. Westbrook, Cleveland Heights, Ohio, assignor to The Grasselli Chemical Company, Cleveland, Ohio, a corporation of Delaware Application March 24, 1930, Serial No. 438,653

10 Claims. (Cl. 23—119)

The present invention relates to a process of making ammonium sulphate directly from ammonia and sulphur dioxide.

It is known that by heating and mixing gases containing oxygen, water, ammonia and sulphur dioxide a mixture of ammonium sulphite and ammonium sulphate is obtained. Such a mixture has very little use, as the sulphite contained therein makes it unavailable for fertilizing purposes, which is the main outlet for ammonium sulphate. Complete conversion of the sulphite into sulphate is difficult to obtain under ordinary conditions and even the use of super-atmospheric pressure or catalysts, such as S, Se, Te, As, $As_2O_3$, Hg, Cu, Pt, Fe and others does not seem to have given satisfactory results.

Aqueous solutions of ammonia and sulphur dioxide have likewise been combined and treated with an oxidizing agent, such as atmospheric air, but here again it would seem that complete conversion to ammonium sulphate is not economically possible.

I have found that the reaction between $SO_2$, $NH_3$, $O_2$ and $H_2O$ to produce ammonium sulphate takes place rapidly and substantially completely in the presence of small amounts of nitrogen oxides, and my invention comprises the process of producing ammonium sulphate by reacting sulphur dioxide, ammonia, oxygen and water vapor with each other in the presence of small amounts of nitrogen oxides.

I understand that the nitrogen oxides act in this reaction as a catalyst of the type which undergoes a certain chemical change and is continuously regenerated until the desired reaction is completed.

The nitrogen oxides which are capable of catalytically acting in this manner are those which are readily oxidized by atmospheric air to an intermediate or the highest oxidation stage, or those, such as $N_2O_5$, which are easily reduced to a lower oxidation stage. They act as oxygen transmitters. Nitrous oxide, $N_2O$, does not have these properties, as is well known. $N_2O$ is therefore excluded from the term "oxygen transmitting nitrogen oxide", which term is meant to embrace the other nitrogen oxides, including NO and $N_2O_5$, which were found capable of catalyzing the reaction between $NH_3$, $SO_2$, $H_2O$ and $O_2$.

Solid ammonium sulphites have a considerable vapor tension at ordinary temperature and dissociate into $NH_3$, $SO_2$ and $H_2O$. When such solid ammonium sulphite, or ammonium bisulphite is brought into contact with an atmosphere containing oxygen and oxygen transmitting nitrogen oxides, reaction takes place with substantially complete formation of ammonium sulphate. Reaction may take place both in the solid and vapor phase, but as under ordinary conditions there is a gas phase present over solid ammonium sulphite and as the final result is the same as when leading ammonia and sulphur dioxide gases into an atmosphere containing the requisite amounts of oxygen, water vapor and oxygen transmitting nitrogen oxides, no conclusion as to the reaction mechanism can be drawn from the fact that ammonium sulphite reacts in the same manner as a gas phase containing $SO_2$, $NH_3$ and $H_2O$.

It is believed that the catalytic action of oxygen transmitting nitrogen oxides in the present reaction is essentially different from that of these compounds in the manufacture of sulphuric acid in lead chambers. As is well known in the latter art, the concentration, temperature, etc., of the pre-formed sulphuric acid present is all important for a successful performance of the operation and all theories developed and accepted at the present require the presence of free sulphuric acid as an essential element in the reaction. No substantial amounts of free sulphuric acid can possibly exist in my catalytic oxidation of ammonia and sulphur dioxide to ammonium sulphate. It would also appear strange that under the reacting conditions practically no action between ammonia and the lower nitrogen oxides leading to the formation of nitrogen seems to take place. Substantially all of the ammonia submitted to my novel reaction can be accounted for as ammonium sulphate.

There is another essential difference between the sulphuric acid formation in the chamber process and my present process of catalyzing the oxidation of the complex ammonia plus sulphur dioxide plus water. There is practically no reaction between sulphur dioxide, oxygen and water at ordinary temperature in the absence of a catalyst. Ammonium sulphite, or its equivalent, a mixture of ammonia, sulphur dioxide and water vapor undergoes at ordinary temperature in contact with atmospheric air considerable oxidation to ammonium sulphate. It is this particular reaction which I found can be catalyzed, or speeded up by the presence of nitrogen oxides. Moreover, I have found that by contacting the gases $NH_3$, $SO_2$, $O_2$ and $H_2O$ in the presence of oxygen transmitting nitrogen oxides, the amount of ammonium sulphate formed corresponds to a yield of over 95% on the ammonia and sulphur dioxide used, while in a parallel experiment omitting the ammonia, all other conditions being the same, the amount of sulphuric acid formed in the same time of gas contact corresponds to a yield of only 1.8% on the sulphur dioxide. This proves to me that the two reactions are of an entirely different nature, and that the reactions involving the formation of ammonium sulphate from the system $$SO_2 + NH_3 + H_2O + N_2O_3$$

do not proceed through the step of primary oxidation of the SO₂ and subsequent neutralization of the resulting SO₃, or H₂SO₄ with ammonia.

The concentration of the reacting gases and the temperature are features influencing the time in which complete conversion to ammonium sulphate takes place.

The usual sulphur or pyrites burner gases, or sulphur dioxide from other sources, when diluted with atmospheric air to give the requisite amount of oxygen can by my novel process easily be converted into ammonium sulphate, avoiding thereby the necessity of preforming sulphuric acid.

Another considerable economic advantage results from performing the reaction in the absence of liquid water. The ammonium sulphate is obtained in my novel process directly solid, substantially anhydrous and in a fine state of division, which allows of its use without further manipulations.

My novel process is further applicable to very dilute gases which are usually an industrial nuisance and from which the obnoxious constituents are very difficultly removed. Exit gases from contact sulphuric acid plants contain sometimes as high as 0.5% SO₂. All methods known to date to recover this SO₂ are expensive and the costs of such recovery exceed in most instances the value of the recovered material. Such operations are therefore only performed when legal requirements prevent the dissemination of sulphur dioxide containing gases into the atmosphere. My novel process allows now of abating this nuisance and at the same time recovering at a very low cost a valuable, directly salable material.

The source of ammonia gas needed in my process is, of course, entirely immaterial.

The nitrogen oxides are conveniently obtained by volatilizing nitric acid into the reaction space. Another very practical manner of adding the catalytically acting nitrogen oxides to the reaction gases is to by-pass a small proportion of the ammonia gas through a platinum oxidation element, such as used for the synthetic manufacture of nitric acid. The NO obtained primarily is then mixed with the SO₂ and NH₃ gases.

Chamber acid plants are usually operated in such a manner that the exit gases contain small amounts of niter. As a matter of fact a common check by the foreman of a lead chamber system is to see that his exit gases are reddish brown when in contact with the atmosphere. Such exit gases containing nitrogen oxides are another possible, and an exceedingly cheap, source of oxygen transmitting nitrogen oxides, usable in the performance of my invention.

Still another means of obtaining an oxygen carrying gas containing nitrogen oxides as needed in the performance of the present invention, is to bubble air through nitrous vitriol as obtained from Gay-Lussac towers. Bubbling air at 80° F. at a slow rate through nitrous vitriol containing 1.45% N₂O₃ produced, for instance, an air current containing 0.105 gram N₂O₃ per cubic foot.

The oxygen needed is conveniently introduced in the form of air and the water is added in any desired form, such as steam, or a fine spray which would volatilize in the reaction space.

In performing the reaction entirely in the gaseous phase I provide for relatively large reaction spaces, such as towers or brick chambers. The dimensions of the spaces are adjusted in such a manner that the gases pass through them at a speed allowing for complete reaction. The reacting gases are continuously introduced in predetermined measured amounts, using well known means for measuring gases. Air being the most convenient oxygen carrying gas there will be an excess of non-reacting gases continuously eliminated from the reaction space and these will to a certain extent determine the gas velocity in the reaction space.

The ammonium sulphate forms as a fine, fluffy crystalline powder which settles in the reaction chamber and is removed therefrom in any desired manner. Some of the solid material is entrained in the non-reacting gases which escape from the reaction spaces and is easily recovered by passing the gases through filter bags. The nitrogen oxide catalyst is also eliminated with the non-reacting gases. It is in such a dilution that it is not harmful and can be disseminated into the atmosphere.

The reactions involved in the formation of ammonium sulphate from the system

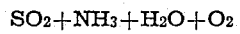

$$SO_2 + NH_3 + H_2O + O_2$$

are strongly exothermic, and in order to avoid side reactions when catalyzing the oxidation with nitrogen oxides, it is very important to absorb the heat of reaction. While this can be done by various methods well known in the art of treating gases, it can be most conveniently effected by diluting the reaction gases with an inert medium and the best results have been obtained by operating in a gas phase containing substantially not more than one volume per cent SO₂.

When reacting with an oxygen carrying gas and an oxygen transmitting nitrogen oxide upon solid, preformed ammonium sulphite, I provide for a reaction space which can be smaller than in the case of the reaction taking place entirely in the vapor phase. I use preferably a device where the solid ammonium sulphite is agitated and in which continuously new surfaces of the solid material are exposed to the reacting atmosphere. A tumbling barrel of conventional design is well adapted to such a process. Air laden with small amounts of nitrogen oxides is continuously introduced into the space and the excess non-reacting gases allowed to escape. It will be found that under correct conditions the escaping gases are substantially free from unreacted ammonia and sulphur dioxide. It would also be possible to suspend fine ammonium sulphite in a current of air and mix it with the nitrogen oxide, allowing the reaction to take place and collecting the ammonium sulphate formed in filter bags or through electric precipitation methods, as is well known in the arts of separting solids from gas currents.

As an example how to perform my novel process in connection with preformed ammonium phite, I mention the following:

An ammonium sulphite was used as obtained by introducing ammonia gas and water into sulphur burner gas. It was a white crystalline powder consisting essentially of ammonium sulphite and containing SO₂ in excess of its equivalent of the ammonia present, also a small amount of ammonium sulphate. This was exposed at about 70-80° F. to a slow, moist current of atmospheric air containing about 0.1 gram oxygen transmitting nitrogen oxides per cubic foot. After five hours exposure the sample contained over 85% ammonium sulphate and after 24 hours the composition of the reaction product was 0.57% ammonium sulphite and 96.04% ammonium sulphate without the presence of an acid salt. The total ammonia present in the original product could be accounted for in the ammonium sulphate obtained. There was a loss of about 9% of the sulphur dioxide content of the original product. This loss is interesting, as it would indicate that the reaction does not primarily affect the sulphur dioxide, but that the co-presence of ammonia is essential under the conditions of the present reaction, and that the amount of $SO_2$ oxidized is about chemically equivalent to the amount of ammonia present. If $SO_2$ were primarily oxidized to $SO_3$, or $H_2SO_4$ as $H_2O$ is present, formation of bisulphate would be expected, without any substantial loss of $SO_2$, which is contrary to the results obtained.

The time required for complete oxidation when performing my novel process purely in the gas phase is entirely dependent upon the concentration of the reacting gases and the temperature. The most favorable conditions seem to obtain be between 70 and 125° F. An excess moisture over that theoretically required in the reaction is also favorable to the reaction. Oxygen should also be in excess. On the other hand the relative proportions of ammonia and sulphur dioxide are preferably adjusted to the proportion corresponding to the final product, that is to say, two molecular proportions of ammonia to one of sulphur dioxide. Slight excesses of either one of the components does not seem to materially affect the completeness and speed of the reaction. Excesses of $SO_2$ are simply lost in the spent gases. As ammonia is the more costly raw material, a slight excess of sulphur dioxide might be preferred from an economic standpoint, so as to insure complete utilization of the ammonia in cases of irregular admission of the gases into the reaction space.

The amount of oxygen transmitting nitrogen oxides needed to catalyze the reaction is relatively small. It was found that amounts chemically equivalent to about 2% of the ammonia consumed, when all other conditions are adjusted for a speedy reaction, were sufficient to produce substantially complete reaction in about 2 minutes time of contact. Concentrations down to 0.01 gram $N_2O_3$ per cubic foot of reacting gases were found sufficient for complete conversion in a very short time.

It is evident that an efficient co-mingling or mixing of the gases as they enter the reaction space is conducive to a rapid completion of the reaction.

I prefer to introduce the reacting gases separately and at adjacent places into the reaction space in such a manner that the nitrogen oxides are present when the ammonia, sulphur dioxide, water vapor and oxygen come in contact with each other.

The only economical source of oxygen available is, of course, atmospheric air. The inert nitrogen introduced together with such oxygen acts merely as a dilutent, and while it does not take part in the reaction, its presence seems to have a favorable action, as in general the reaction seems to be more rapid in dilute gases than in concentrated gases.

The appended drawing shows in a diagrammatic form one operative procedure of the production of ammonium sulphate by the gas phase reaction according to my invention.

It shows a relatively large reaction chamber 1 into which air at 2, steam 3, $SO_2$ gas 4, nitrogen oxides 5 and ammonia gas 6 are introduced. These gases react to form solid ammonium sulphate which collects at the bottom of the reaction chamber from which it is removed by ordinary well known means 7. The non-reacted gases, mainly nitrogen from the atmospheric air and traces of nitrogen oxides pass through bag filters 8, in which entrained solid ammonium sulphate is collected, and exit to the atmosphere.

The nitrogen oxides are, according to this procedure formed by dividing the flow of ammonia gases into a major flow 9 which is led directly into the reaction chamber at 6, and a minor flow 10 which is mixed with air at 11, passed through an ammonia oxidation unit 12 in which nitrogen oxides are formed which are then led into the reaction chamber 1 at 5.

The following is a description of the conditions under which I successfully performed my novel process entirely in the gas phase:

A sulphur dioxide gas containing 0.5% by volume of $SO_2$ and 7% oxygen figured on a dry basis was humified at 70 to 80° F. so as to obtain about 90% relative humidity. This gas was led into a reaction space and concurrently gaseous ammonia obtained by evaporation of liquid ammonia and air laden with $N_2O_3$ added in such proportions that there were about 2 molecular proportions of ammonia to each one of sulphur dioxide and an amount of $N_2O_3$ equivalent to about 2.6% of the ammonia. The temperature was kept at between 70 and 80° F. The flow of the gases was so adjusted that they remained about 8 minutes in the reaction space and the spent gases were passed through bag filters. While it was known from the investigation of the reaction that 2 minutes' time would be sufficient for completion of the reaction under these conditions, a larger space was provided to give the ammonium sulphate time to settle from the gases before reaching the bag filters, and thereby minimize their clogging up and avoiding increase in their resistance to the flow of the spent gases.

The gases leaving the bag filters were substantially free from ammonia and sulphur dioxide. The amount of nitrogen oxides contained therein was so low as to be entirely harmless and their dissemination into the atmosphere could not be objected to.

The solid product collected in the reaction space and in the bag filters was a very light, white, crystalline powder. On analysis it showed the following composition:

| | Percent |
|---|---|
| Ammonium sulphate | 95.0 |
| Ammonium bisulphate | 3.5 |
| Ammonium sulphites | 0.5 |
| Ammonium nitrate and ammonium nitrite | 0.5 |
| Water | 0.5 |

As obtained the product would be entirely suited for making compounded fertilizers.

The amounts of this product obtained correspond to a recovery of over 95% of the raw materials used.

The slight amount of bisulphate contained could easily be converted into neutral sulphate by contacting it with ammonia gas and this could be conveniently effected by introducing the product into the flow of ammonia gas and separating it therefrom before the ammonia enters the reaction space.

In a preferred embodiment of my invention I operate my process in such a manner that atmospheric air, water, ammonia and sulphur dioxide are the only raw materials required. The nitrogen oxides are obtained from the ammonia. The regulated flow of ammonia is divided into a major and a minor flow. The amount contained in the major flow is chemically equivalent to the amount of sulphur dioxide and is introduced directly into the reaction space. The amount contained in the minor flow is between 2 and 3% of the amount in the major flow. This secondary ammonia is passed, with the necessary air, through an ammonia oxidation element, from which the required amounts of oxygen transmitting nitrogen oxides are obtained. This minor flow is then introduced into the reaction space adjacent to the zone where the ammonia and sulphur dioxide come in contact. It is in this manner exceedingly simple to control the amounts of nitrogen oxides and other reagents introduced into the reaction space and secondary reactions are avoided.

When it is desired to make ammonium sulphate directly out of the burner gases of a high $SO_2$ concentration, this can easily be effected by diluting the gases with humified air to around one volume per cent $SO_2$ content and then reacting thereon with ammonia in the presence of oxygen transmitting nitrogen oxides. It is also possible to contact the strong, humified sulphur burner gases with the requisite amount of ammonia. Solid ammonium sulphite precipitates out of the gases and there will be a spent gas containing ammonia and sulphur dioxide in an amount corresponding to the dissociation pressure of the ammonium sulphite at the precipitation temperature. I then treat this spent gas separately with oxygen transmitting nitrogen oxides after the gas phase has been adjusted to contain the necessary excess oxygen and water vapor, and the solid, separated ammonium sulphite is also contacted with the requisite amount of air containing a small amount of oxygen transmitting nitrogen oxides.

I claim:

1. In a process of making ammonium sulphate the step of catalyzing the gas phase reaction between sulphur dioxide, ammonia, oxygen and water by means of an oxygen transmitting nitrogen oxide.

2. In a process of making ammonium sulphate the step of catalyzing the gas phase reaction between sulphur dioxide, ammonia, oxygen and water vapor by means of an oxygen transmitting nitrogen oxide and in the presence of a solid ammonium sulphite.

3. The process of making ammonium sulphate which comprises contacting sulphur dioxide, ammonia, oxygen containing gases and water vapor in the presence of an oxygen transmitting nitrogen oxide under conditions where ammonia and sulphur dioxide are present in substantially reacting proportions and both oxygen and water vapor are present in excess over the amounts required to form ammonium sulphate the amount of water vapor present being insufficient to condense during the reaction.

4. The process of making ammonium sulphate which comprises continuously introducing sulphur-dioxide gas, ammonia gas, the constituents of atmospheric air and water vapor into a reaction space, the amounts of ammonia and sulphur-dioxide being in about the molecular proportion of 2:1, the amounts of oxygen and water vapor being in excess of those required to form ammonium sulphate and the amount of water vapor insufficient to condense during the reaction, adding thereto continuously small amounts of an oxygen transmitting nitrogen oxide, withdrawing the spent gases from the reaction space and recovering the ammonium sulphate formed.

5. The process of making ammonium sulphate which comprises continuously introducing sulphur dioxide in the form of dilute sulphur burner gases containing a high percentage of relative humidity and ammonia gas but less water vapor than would condense in substantially reacting proportions into a reaction space, simultaneously adding small amounts of an oxygen transmitting nitrogen oxide, maintaining the temperature in the reaction space between about 70 and 125° F., continuously withdrawing from said reaction space the spent gases, and recovering the ammonium sulphate formed.

6. The process of making ammonium sulphate which comprises dividing a flow of ammonia gas into a major and a minor flow, introducing said major flow into a reaction space, simultaneously introducing into said reaction space sulphur dioxide gas in molecular proportion of about $2NH_3:1SO_2$, the constituents of atmospheric air and water vapor in amounts in excess of those needed to form ammonium sulphate but less than would condense, mixing said minor flow of ammonia with an oxygen carrying gas, passing the mixed gas through an ammonia oxidation element, and adding the resulting oxygen transmitting nitrogen oxide containing gas into said reaction space, continuously withdrawing the spent gases from said reaction space, and recovering the ammonium sulphate formed.

7. The process of making ammonium sulphate which comprises adding small amounts of an oxygen transmitting nitrogen oxide to a gas phase system comprising sulphur dioxide, ammonia, oxygen and water vapor under conditions where the reacting components are greatly diluted with an inert gas, and where the ammonia and sulphur dioxide are present in the ratio of about 2 molecular equivalents of ammonia to one molecular equivalent of sulphur dioxide and where there is a large excess of oxygen and water vapor present but less than would condense in the system.

8. The process of making ammonium sulphate which comprises adding a small amount of an oxygen transmitting nitrogen oxide to a gas phase containing about 0.5 volume per cent $SO_2$ and two molecular amounts of $NH_3$ for each molecular amount of $SO_2$, a large excess of oxygen and water vapor but less than would condense in the phase, nitrogen being the dilutent of the gas phase, and maintaining the temperature between about 70 and 125° F.

9. A process for the manufacture of sulphates of ammonia by oxidation of initial materials which include ammonia and sulphur dioxide, consisting in treating the initial materials with oxidizing gases in the presence of a catalyst comprising at least one oxygen transmitting nitrogen oxide in a quantity which is small as compared to that of the reaction components, said initial materials being solid compounds containing ammonia and sulphur dioxide.

10. Process for the manufacture of ammonium sulphate by oxidation of initial materials which include ammonia and sulphur dioxide comprising treating the initial materials with oxidizing gases in the presence of a catalyst comprising at least one oxygen transmitting nitrogen oxide present in a quantity which is small compared to that of the reaction components, said initial materials being in a nonliquid state.

LEON R. WESTBROOK.